United States Patent [19]

Kang

[11] Patent Number: 5,735,665
[45] Date of Patent: Apr. 7, 1998

[54] REACTION HYDRAULIC TURBINE

[76] Inventor: Han Sol Kang, 129-6 Seowan San-dong, 2ga, Wansan-ku, Chonju-shi, Chollabuk-do 560-150, Rep. of Korea

[21] Appl. No.: 737,117
[22] PCT Filed: Apr. 13, 1995
[86] PCT No.: PCT/KR95/00038
  § 371 Date: Oct. 18, 1996
  § 102(e) Date: Oct. 18, 1996
[87] PCT Pub. No.: WO95/28564
  PCT Pub. Date: Oct. 26, 1995

[30] Foreign Application Priority Data

Apr. 18, 1994 [KR] Rep. of Korea .................. 1994-8047

[51] Int. Cl.$^6$ .................................................. F03B 13/12
[52] U.S. Cl. .................................. 415/3.1; 415/906
[58] Field of Search ............... 415/2.1, 3.1, 905, 415/906

[56] References Cited

U.S. PATENT DOCUMENTS

| | | |
|---|---|---|
| 102,939 | 5/1870 | Hubbard ..................... 415/3.1 |
| 1,441,955 | 1/1923 | Walker ........................ 415/3.1 |
| 5,440,175 | 8/1995 | Mayo, Jr. et al. ............ 415/3.1 |

FOREIGN PATENT DOCUMENTS

| | | |
|---|---|---|
| 3621312.8 | 6/1986 | Germany . |
| 231177 | 12/1984 | Japan . |
| 40464 | 2/1986 | Japan . |

Primary Examiner—John T. Kwon

[57] ABSTRACT

A reaction hydraulic turbine used for converting the energy of a flowing stream into mechanical energy of a rotating shaft is disclosed. In the turbine, the blades have a specifically-designed configuration suitable for not only reducing the hydraulic resistance but also for concentrating the energy of the flowing stream onto the blades. The internal surface of each blade has a half-circular curved section, while the external surface has a streamline section, which is smoothly put into or come out of water thus being almost completely free from hydraulic resistance. At the lowermost portion of the turbine, the energy of the flowing stream is effectively concentrated onto the curved internal surface of each blade.

4 Claims, 2 Drawing Sheets

REACTION HYDRAULIC TURBINE

BACKGROUND OF THE INVENTION

1. Field of the Invention

The present invention relates in general to reaction hydraulic turbines used for converting the energy of a flowing stream into mechanical energy of a rotating shaft and, more particularly, to an improvement in the blade's configuration of such turbines for effectively reducing the hydraulic resistance acting on the blades of a turbine when the blades are put into or come out of water thus improving the operational efficiency of the reaction hydraulic turbines.

2. Description of the Prior Art

Different from gravity water wheels and impulse hydraulic turbines, reaction hydraulic turbines almost completely have nothing to do with the gravity head of water but convert the energy of a flow stream, for example, of the tides or a river into mechanical energy of a rotating shaft. A reaction hydraulic turbine is installed in a way such that the lower section of the runner is sunk in water so that the runner is rotated by the energy of a flowing stream in the same direction as the stream.

In typical reaction hydraulic turbines, the operational efficiency may be improved by either increasing the rotating force of the rotating shaft or by increasing the amount of water acting on the blades. In this case, the rotating force of the rotating shaft may be increased by enlarging the radius between the rim and rotating shaft of the runner, while the amount of water acting on the blades is increased by enlarging the vertical intersection area of each blade or by enlarging the width of the runner. In a typical reaction hydraulic turbine, the blades are radially attached to the rim of the runner. In this regard, the flowing stream of the tides or river meets at right angles with the blades at the lowermost portion of the runner in water so that the energy of the flowing stream may be effectively applied to the blades. However, the energy of the flowing stream does not act on the blades at portions of the runner where the runner is put into or come out of water. When the blades are put into or come out of water, the blades are parallel to the water surface so that a strong hydraulic resistance act on the blades. The hydraulic resistance acting on the blades in the above state regrettably offsets a part of the effective hydraulic energy obtained by the blades positioned at the lowermost portion of the runner. Therefore, the typical reaction turbines have inferior operational efficiency.

SUMMARY OF THE INVENTION

It is, therefore, an object of the present invention to provide a reaction hydraulic turbine in which the above problems can be overcome and which has structurally-improved blades suitable for effectively reducing the hydraulic resistance acting on the blades when the blades are put into or come out of water thus improving the operational efficiency of the reaction hydraulic turbines.

In order to accomplish the above object, a reaction hydraulic turbine in accordance with the preferred embodiment of this invention comprises a longitudinal hermetic cylinder sided by opposite side panels of a circular shape and provided with an auxiliary panel of a circular shape transversely set in a middle portion of the cylinder, the cylinder having a radius of the ratio 4:5 to a radius of each side panel, and a plurality of regularly-spaced blades axially attached to the outer surface of the cylinder, each blade having an internal surface curved with a half-circle given by a diameter equal to a difference between the radius of each side panel and the radius of the cylinder and an external surface of a streamline curve extending from the tip of each blade on the circumcircle of each side panel to an inscribed circle of the cylinder within a distance equal to the pitch of the blades.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
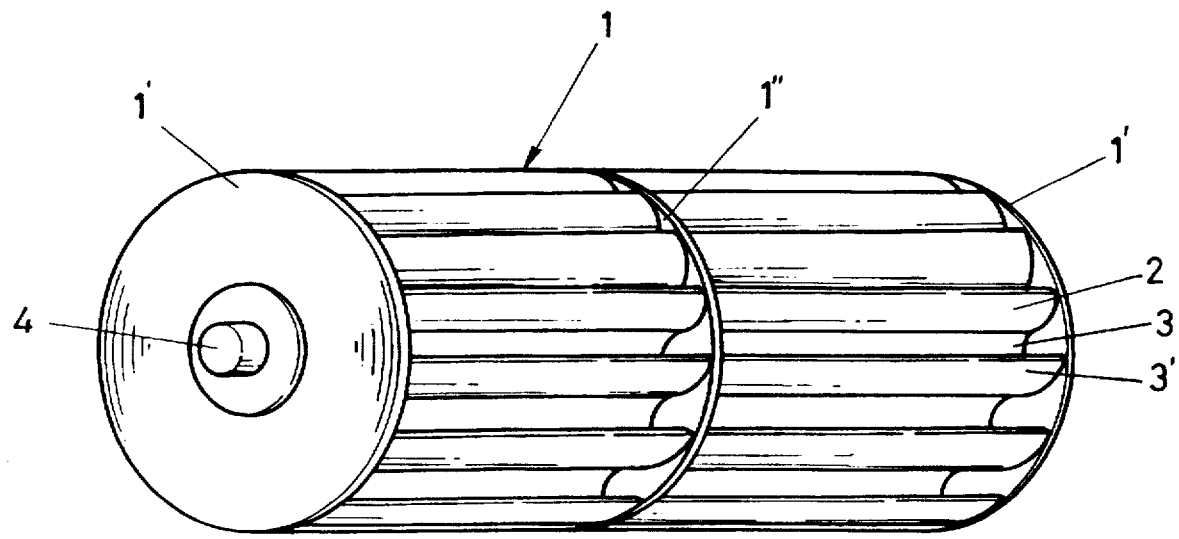
FIG. 1 is a perspective view showing the configuration of the reaction hydraulic turbine in accordance with the preferred embodiment of the present invention.
Figure 2:
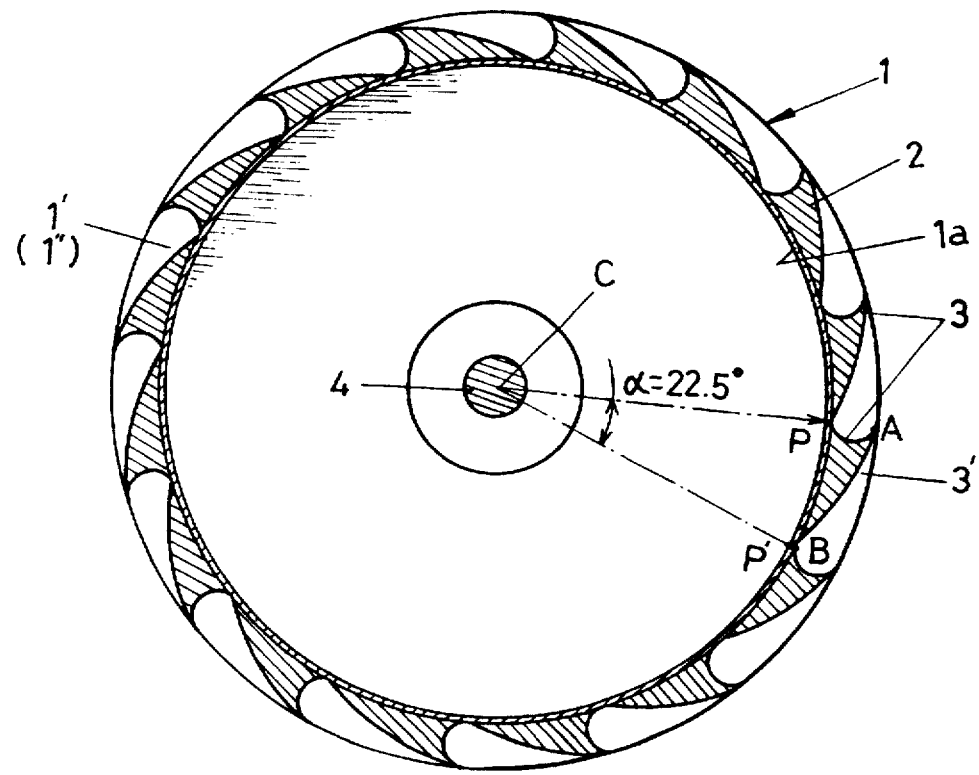
FIG. 2 is a sectional view of the reaction hydraulic turbine of FIG. 1.
Figure 3:
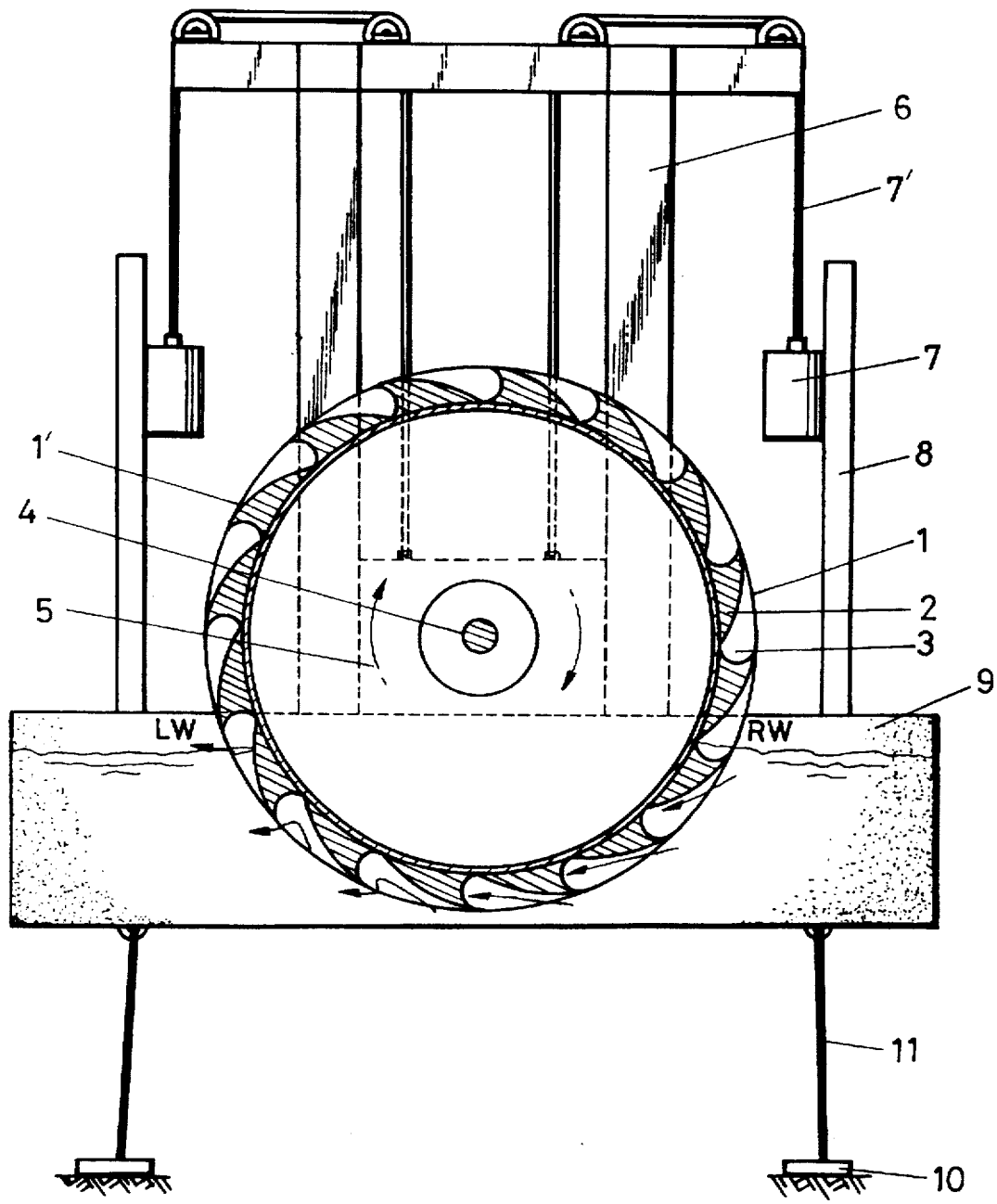
FIG. 3 is a sectional view showing the operation of the reaction hydraulic turbine of FIG. 1.

The reaction hydraulic turbine, according to the preferred embodiment of this invention, is shown in FIGS. 1 to 3. In the same manner as described for the prior art, the reaction hydraulic turbine of this invention is used for converting the energy of a flowing stream of, for example, the tides or river into mechanical energy of a rotating shaft.

As shown in FIGS. 1 to 3, the reaction hydraulic turbine 1 of this invention includes a longitudinal hermetic cylinder 1a, which is sided by both side panels 1' of a circular shape. An auxiliary panel 1" of a circular shape is transversely set in the middle portion of the cylinder 1a so that the three panels 1' and 1" are parallel together. In the above turbine 1, it is preferred to set the ratio of radius CP of the cylinder 1a to the radius CA of each side panel 1' as 4:5–4:6. A plurality of blades 2 are axially attached to the outer surface of the cylinder 1a so that the blades 2 are spaced out at regular intervals. In each blade 2, the cross-section of the water acting surface or the internal surface 3 is a half-circle given by the diameter PA, which is equal to a difference between the radius CA of each side panel 1' and the radius CP of the cylinder 1a. Meanwhile, the external surface 3' of each blade 2 has a streamline curve, which extends from the tip of the blade 2 positioned on the circumcircle A of the side panel 1' to the inscribed circle B of the cylinder 1a within the distance PP' equal to the pitch of the blades 2.

In the drawings, the reference numeral 4 denotes the rotating shaft of the turbine, 5 denotes a bearing of the rotating shaft, 6 denotes a support column, 7 denotes a balance weight, 7' denotes a wire extend from the weight to the bearing, 8 denotes a guide column for guiding the weight, 9 denotes a floater, 10 denotes an anchor, 11 denotes an anchor rope.

The operational effect of the above reaction hydraulic turbine will be described hereinbelow.

As shown in FIG. 3, the turbine 1 is installed on the floater 9 by rotatably seating the rotating shaft 4 of the turbine 1 into the bearings 5 held by the support columns 6. The sinking depth of the above turbine 1 in water can be adjustable in accordance with the depth of the water. That is, the turbine 1 along with the bearings 5 can be vertically moved relative to the support columns 6 of the floater 9 by adjusting the balance weights 7. The above floater 9 is anchored by the anchors 10 on the ropes 11, which are dropped from the floater 9 into the water thus preventing the floater 9 from moving away. The turbine 1 in the above state is rotated by the flowing stream of the water thus converting the energy of the flowing stream into the mechanical energy of the rotating shaft 4. As described above, the internal surface 3 of each blade 2 has a half-circular curve, while the external surface 3' of each blade 2 has a streamline curve. Due to the above specifically-designed surfaces 3 and 3' of each blade 2, the blades 2 at the portion RW are smoothly put into water with the lower portion of the external surface 3' which is put into water prior to the higher portion of the surface 10 Therefore, when the blades 2 are put into the water at the portion RW, the hydraulic resistance acting on the external surface 3' of each blade 2 is almost negligible. On the other hand, when the blades 2 come out of water at the portion LW, the internal surface 3 of each blade 2 is directed downward, and the lower portion of the external surface 3' comes out of water prior to the higher portion of the surface 3'. Therefore, when the blades 2 come out of water at the portion LW, the hydraulic resistance acting on the blades 2 is almost negligible.

In addition, the cylinder 1a of the turbine 1 is hermetically sealed so that the water is not introduced into the cylinder 1a while the turbine 1 is rotated by the flowing stream. Therefore, the above turbine 1 is free from hydraulic resistance caused by introduction of water into the cylinder 1a. At the lowermost portion of the turbine 1 sunk in the water, the internal surface 3 of each blade 2 meets at right angles with the flowing stream so that the energy of the flowing stream is effectively concentrated onto the curved internal surface 3 thus increasing the rotating force of the turbine 1.

As described above, the present invention provides a structurally-improved reaction hydraulic turbine which is preferably used for converting the energy of a flowing stream of, for example, the tides or river into mechanical energy of a rotating shaft. In the above turbine, the blades have a specifically-designed configuration suitable for not only reducing the hydraulic resistance acting on the blades but also for concentrating the energy of the flowing stream onto the blades. That is, the internal surface of each blade has a half-circular curved section which is rightly directed upward or downward when the blades are put into or come out of water. The external surface of each blade has a streamline section, which is smoothly put into or come out of water thus being almost completely free from hydraulic resistance when the blades are put into or come out of water. Meanwhile, at the lowermost portion of the turbine in the water, the energy of the flowing stream is effectively concentrated onto the curved internal surface of each blade. The negligible hydraulic resistance acting on the blades does not offset the energy obtained by the blades at the lowermost portion of the turbine. The above turbine thus has a high operational efficiency and is preferably used as an effective energy source. Another advantage of the above turbine resides in that the blades are structurally stronger than the prior art blades so that the expected life span of the turbine is remarkably extended.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A reaction hydraulic turbine including a longitudinal hermetically sealed cylinder, said cylinder having a radius, a middle portion, circular side panels attached at each of its two ends, an outer surface and an inner surface, wherein each said side panel having a radius larger than that of said cylinder, and a plurality of regularly-spaced blades axially attached to the outer surface of said cylinder, each said blade comprising:

an internal surface curved as a half-cylinder defined by a diameter equal to a difference between the radius of the side panels and the radius of the cylinder; and an external surface curved as a streamline curve extending from the internal surface of the blade to the internal surface of the following blade wherein a ratio of the cylinder radius to the side panel radius is define to be between 4:5 and 4:6.

2. The turbine in accordance with claim 1, wherein the cylinder further comprises an auxiliary panel of a circular shape transversely set in the middle portion of the cylinder.

3. A reaction hydraulic turbine, comprising:

a longitudinal hermetically sealed cylinder, said cylinder having a radius, a middle portion, two ends, an outer surface and an inner surface;

two side panels of a circular shape, each said side panel attached at a respective end of said cylinder and having a radius larger than that of said cylinder; and a plurality of regularly-spaced blades axially attached to the outer surface of said cylinder, wherein each said blade having:

an internal surface curved as a half-cylinder defined by a diameter equal to a difference between the radius of the side panels and the radius of the cylinder; and an external surface curved as a streamline curve extending from the internal surface of the blade to the internal surface of the following blade wherein a ratio of the cylinder radius to the side panel radius is defined to be between 4:5 and 4:6.

4. The turbine in accordance with claim 5, wherein the cylinder further comprises an auxiliary panel of a circular shape transversely set in the middle portion of the cylinder.

* * * * *